X346-37
X5813C

Sept. 27, 1955 E. C. BARR 2,719,222

INSTRUMENT FOR SURVEYING HIGH FREQUENCY WAVE RECEIVERS

Filed April 28, 1952

INVENTOR.
ELDON C. BARR

BY George R. Bliss
Attorney 2,719,222

INSTRUMENT FOR SURVEYING HIGH FREQUENCY WAVE RECEIVERS

Eldon C. Barr, Yakima, Wash.

Application April 28, 1952, Serial No. 284,837
6 Claims. (Cl. 250—20)

This invention relates to apparatus for determining listening habits of users of receivers of radio frequency waves from a plurality of broadcasting machines, each operating on a distinctive frequency. It particularly relates to such an apparatus which has a sweep tuned receiver capable of picking up sequentially and reproducing, preferably by means of a tape recorder, the signals emanating from the local oscillators of the receivers of the users, of the superheterodyne type.

Commercial radio and television broadcasting stations are, as is well known, each assigned, by a governmental authority, a specified frequency for their use. Most receivers of radio frequency waves are, for practical reasons, of the superheterodyne type. That is, all the different frequencies of incoming signals to which the receiver may be tuned from time to time are changed to a same new frequency, commonly termed the intermediate frequency, by the heterodyne process. In this process, the frequency to which the receiver is tuned, is changed by combining it with the output of an adjustable local oscillator in a mixer to produce a beat frequency equal to the desired intermediate frequency, regardless of the frequency to which the receiver is tuned. Usually the radio frequency amplifier, oscillator and mixer are gang tuned. If, for example, the desired intermediate frequency is 455 kilocycles and the incoming signal is on a carrier wave from a broadcasting station using, for example, 1000 kilocycles, the selector amplifier stage and mixer are tuned to 1000 kilocycles, and the oscillator to 1455 kilocycles, giving an output from the mixer of an intermediate frequency of 455 kilocycles. This signal, then, at 455 kilocycles is amplified, converted to audio frequency in the detector, amplified, and used to operate a loudspeaker or other signal reproducer.

If now, what may be called a survey receiver, is used to pick up and reproduce the incidentally broadcast radio frequency waves of the local oscillators of a plurality of superheterodyne receivers in a given area, and the receiver is sweep tuned over the range of frequency of these local oscillators, which is the frequency range of the broadcasting stations plus the intermediate frequency of the receivers in the area, it is apparent that if these wave signals are reproduced on an oscilloscope or by means of a tape recorder, an indication of the number of stations tuned to any one broadcasting station will be secured.

This record, when interpreted, makes it possible for station managers, sales managers, program directors and advertising executives to get information on the relative advertising value of different programs. It makes a survey of the listening habits of the radio receiving public that does not depend on questions put to these listeners, phone calls, personal interviews, or inspection of records made by attachments to their receiving sets.

It has been proposed to use a superheterodyne receiver for this purpose, the receiver being designed for a standard intermediate frequency. However, as the frequency band of any one station is swept by such a receiver, signals of all of the local oscillators tuned to that station tend to be combined in one signal, since all of these oscillators are tuned to frequencies approximating the frequency of the broadcasting station plus the standard intermediate frequency used by all the local receivers. On an oscilloscope or recording tape, the amplitude of the signal resulting from the combining of all the signals from any one broadcasting station must be compared with the amplitudes of the similarly combined recorded signals from the several other broadcasting stations, as these signals from the stations are picked up by the sweep tuner, or must be interpreted by comparison with a calibrated scale to determine the relative number of local receivers tuned to each broadcasting station at any one time. As some local receivers are more distance from the survey receiver than others, and as the local oscillators may vary substantially in their incidental broadcasting power, due to differences in the oscillator itself, due to differences in the overall design of the receiving sets, and due to the shielding effect of buildings and of the environment of the receiving set, the survey thus made is at best of only approximate accuracy and dependability. A survey receiver constructed in accordance with this invention and used as it is designed to be used, overcomes this difficulty by its high selectivity which is achieved by a novel method which results, in practically every instance, in the recordation on the oscilloscope or tape of a separate signal from each local receiver tuned to any one broadcasting station. Such a signal will be recorded as a separate pip, which may be small for a weak signal, or large for a strong signal, but nevertheless separate.

In making surveys to determine the relative popularity of several broadcasting programs in a given broadcasting area, recordations must be made in a number of neighborhoods of relatively small size, rather than only one recordation for the entire broadcasting area. This is necessary because the incidentally broadcast signals of the local oscillators received by the survey receiver are too weak to be picked up if the distance from the local oscillator to the survey oscillator is more than a relatively small maximum. Even in a small surveyed area, some signals will not be received at all due to shielding of the oscillators by structural iron or other material in the buildings, but this factor can be usually ignored on the principle that the missed oscillator signals will average about the same as those picked up by the survey receiver.

If only one survey receiver is used, it must be moved from place to place. This is impracticable both because of the expense involved and the fact that the several surveys made in the several receiver neighborhoods will be made at different times, and the station selection by the listeners will vary from one survey period to another. Obviously the most practicable survey method is that of making simultaneous surveys in a large enough number of properly selected sample receiving areas to get a fairly accurate picture of the listening habits of the public over an entire broadcasting area. Also obviously for low labor and other costs such surveys should be automatically made simultaneously by a number of time-controlled survey receivers, and these receivers should be automatically regulated to make recordations, one for each change of program, and preferably only one, and at such a time in the program period that the tuning dialing of the listeners has been fairly well completed and is most nearly stable. A survey receiver constructed in accordance with this invention produces a permanent record as by a recording tape, under a control method which is partly chronological, dependent upon a clock, and partly self-actuated, dependent upon self-contained means for terminating and otherwise controlling the operation of the receiver. Chronological control enables the survey receiver to operate not only for limited periods in correlation with program changes, but also to operate only during those times of the 24 hours of the day which it is desired to survey, eliminating the waste of materials incident to continuous 24 hour operation.

Because of the impracticability of sweep tuning a receiver through 360 degrees, the receiving instrument of this invention is sweep tuned alternately, for a limited number of degrees, as for example 180 degrees, in the one direction of rotation and then reversed and sweep tuned over the same arc in the other direction of rotation over the frequency band of the broadcast stations of either radio or television, or any other frequency band which the instrument is designed to survey. The upper and lower frequency range limit may be adjusted in an instrument of this invention to eliminate unnecessary scanning of the spectrum above and below the governmentally prescribed frequency band, and also to survey and study any particular portion of the spectrum to the exclusion of others, which is sometimes desirable. As one example of this, a special study of a station or several stations may be wished, to ascertain and appraise fluctuations in the number of listeners during the day to that station or those several stations, or fluctuations in the number of listeners on different days but at the same relative time of day on the different days.

Having thus explained some of the purposes and advantages of the invention, a particular embodiment of the invention will be described in connection with an illustrative drawing. This particular embodiment is described in connection with a survey of sound radio broadcasting stations. It is obvious that with appropriate modifications of design, the invention is applicable to television, by sweep tuning the waves of local oscillators tuned to video carrier waves, and the accompanying sound modulated carrier waves. Since the survey receiver picks up only the incidentally broadcast oscillator waves from the local oscillators, and these oscillator waves are unmodulated, the invention operates as well on receivers for frequency modulated (FM) waves as on those for amplitude modulated (AM) waves, or for pulse modulated (PM) waves. The invention, then, is not limited to the particular embodiment hereinafter described, but embraces any device coming within the scope and spirit of the definitions expressed in the appended claims.

Figures 1, 2:
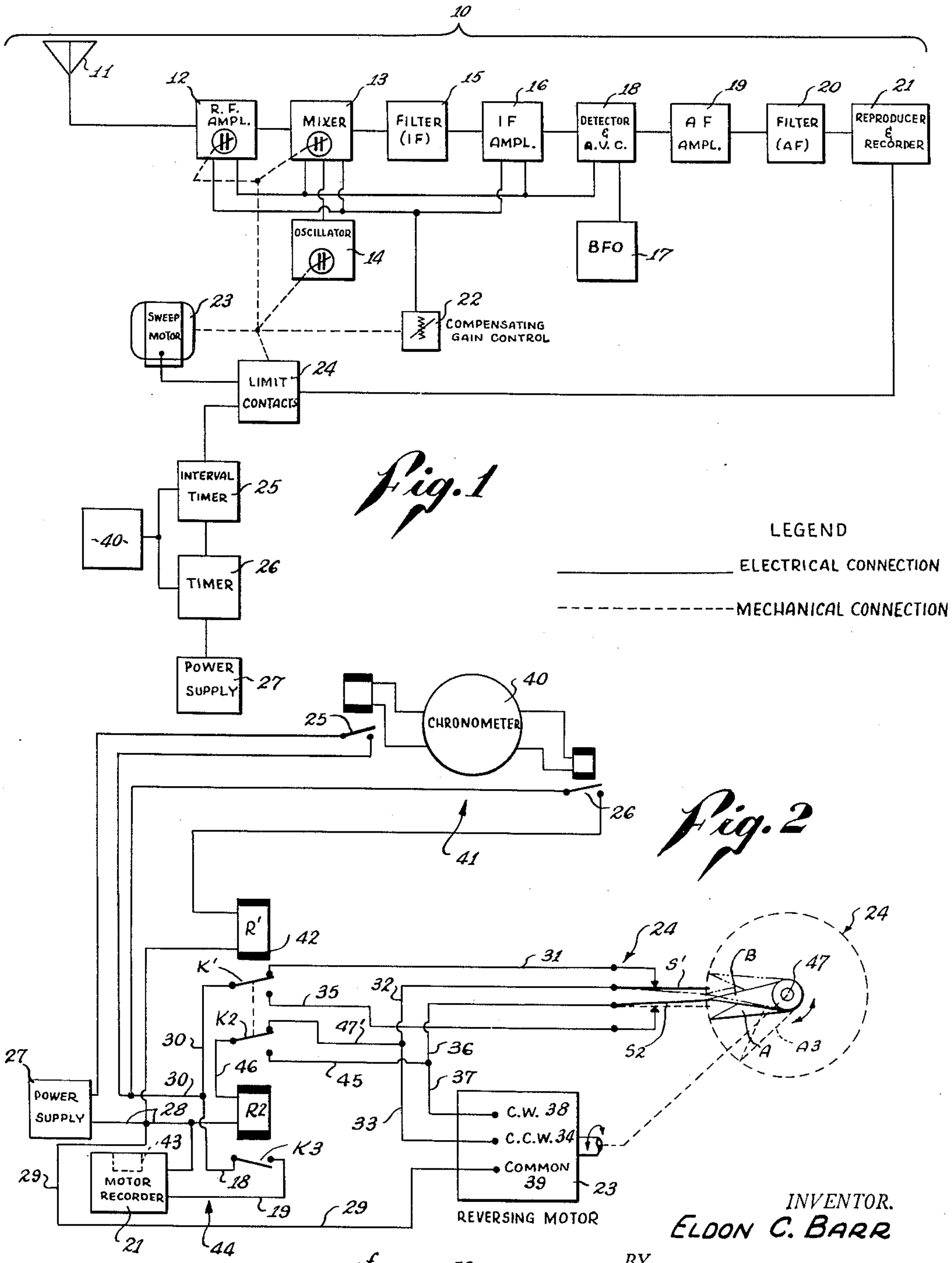
Figure 1 is a block diagram of a survey receiver constructed in accordance with my invention.
Figure 2 is a schematic diagram of the control devices for the sweep tuning motor and for the recorder.

A survey receiver of this invention, functionally illustrated in the block diagram of Figure 1, is designed to be tuned to and to receive the unmodulated signals incidentally broadcast by the adjustable local oscillators of the radio receivers in a neighborhood, which may be tuned to any one of all the broadcasting stations in the area embracing that neighborhood. Assuming that the frequencies of these broadcasting stations vary from 550 kilocycles to 1650 kilocycles, which is approximately the governmentally prescribed frequency band for sound radio broadcasting, the local receiver oscillators may be tuned to put out unmodulated signals of any frequency between approximately 1005 to 2105 kilocycles, which mixed with the correspondingly tuned incoming broadcast signal produces an intermediate radio frequency signal of 455 kilocycles. This is generally the standard intermediate frequency used in modern receivers. Assuming that the frequency of a broadcasting station is 1000 kilocycles, all of the local oscillators should be tuned to that particular station to produce a wave of 1455 kilocycles frequency to mix with the 1000 kilocycle frequency wave of the incoming signal, to generate a wave of 455 kilocycles.

The signal of the local listener's oscillator, of a frequency for example of 1455 kilocycles, is received over the antenna 11 by appropriate tuning of the selector and RF amplifier 12 and mixed in the correspondingly tuned mixer 13 with the waves of the correspondingly tuned oscillator 14 of the survey receiver, indicated as a whole by the numeral 10, to produce an I. F. wave of, for example, 455 kilocycles. While the intermediate frequency of the survey receiver 10 may be other than 455 kilocycles, for practical reasons of economical manufacture, it may be, and herein is assumed to be, 455 kilocycles. The oscillator 14 will then be designed to produce frequencies of from 1460 to 2560 kilocycles, to be mixed with the local oscillator waves from the local receivers tuned to the standard radio broadcasting stations, to produce in the mixer, waves of intermediate frequency of 455 kilocycles.

The selector 12, mixer 13 and oscillator 14 are preferably gang tuned and actuated by the motor 23, in a manner to be later explained. A filter 15 is interposed between the mixer 13 and the I. F. amplifier 16. This filter, which may be of the quartz crystal type or of any other type which will produce the desired selectivity, will pass only signals of 455 kilocycles plus or minus a few hundred cycles, as for example 500 cycles, making the band pass limits 1000 cycles apart.

Because of the inexact tuning of the local oscillators by the listeners, and inexact factory adjustment of the intermediate frequencies of the listeners' wave receivers, the several local oscillators in the listeners' receiving sets will be, even though all tuned to the same broadcasting station, producing waves of frequencies which have been found to commonly vary over about 25 kilocycles. To continue with the particular example of a broadcasting station operating on 1000 kilocycles, the local oscillators will be apt to be tuned to produce waves of any frequency from 1,442,500 cycles to 1,467,500 cycles, and the survey receiver will successively pass these waves on to the filter as I. F. waves of 455 kilocycles as the oscillator 14 is sweep tuned between frequency limits 1,897,500 cycles to 1,922,500 cycles. Assuming that filter 15 has a band pass of 1000 cycles, each signal coming in to the survey receiver 10 at any instant from the neighborhood local oscillators, as these signals are sweep tuned and converted to the I. F. frequency 455 kc. will get through the filter only if its I. F. frequency at the moment is close to the center frequency of 455 kilocycles, as for instance between 454.5 and 455.5 kilocycles. Assuming, for example, that there are 25 such signals having 25 different frequencies, such signals being evenly spread over a 25 kilocycle range, coming from the 25 oscillators of 25 receiving station sets, no two of the resulting I. F. signals will be passed by the filter at any one instant of the movement of the sweep tuner, and each signal when finally indicated on the recording device, in a manner to presently appear, will be entirely disassociated from any other signal, and may be counted separately to indicate one only tuned local receiver of the 25 local receivers all tuned to the same broadcasting station. If now, as is preferable, the band pass curve of the filter 15 has a sharp nose with a high degree of attenuation on its sides, the selectivity is increased and two signals of substantially less than 1000 cycles frequency difference will be separately and distinctly received.

Since the frequencies coming from the amplifier 16 are beyond the range of audibility, and too high for the practical operation of an oscilloscope or tape recorder, and also to make possible additional selectivity, they are converted to an audio frequency of, for example, 1000 cycles, by use of the beat frequency oscillator 17 producing waves of a frequency of 454 or 456 kilocycles, and the detector 18.

It is, of course, apparent that in spite of the inaccurate tuning by the listeners and the variation in the predetermined intermediate frequency of the local receivers, necessitating corresponding variation in the tuning of the local oscillators, the bulk of the radio waves emanating from the local oscillators and received by the antenna 11 will be of frequencies bunched closely around a median frequency of, for example, 1455 for a broadcasting station of 1000 kilocycles. It becomes therefore desirable to still further filter out frequencies in the receiving set 10. To accomplish this, the audio frequency waves of, for example, 1000 cycles plus or minus 500 (pass band of the filter 15), i. e., 500 to 1500 cycles, are after amplification in the amplifier 19, put through a band pass filter 20 with a pass band of, for example, 50 cycles. If now 20 signals evenly spread as to frequency from 500 to 1500 cycles (successively 50 cycles apart) get through the filter 15 at any one instant, nineteen of them will be filtered out by filter 20, leaving only one signal to be passed on to the reproducer and recorder 21. In other words, in the example of I. F., A. F. and band pass filter values above chosen, two local oscillators must be producing waves of frequencies within at most 50 cycles of each other not to be indicated separately on an oscilloscope or not to be recorded separately on a tape recorder. Or putting it still differently, within the known habitual and customary tuned frequency range zone of local oscillators of 25,000 cycles for any particular radio broadcasting station, being listened to, it is possible to consider in the above example that there are at least 500 subzones (25×20) of frequency and if not more than one local oscillator of the surveyed receiver sets is tuned to a frequency in any one of those subzones, each oscillator will be separately and distinctly indicated and can be counted without being confused with the indications of oscillators tuned to frequencies just greater than or less than its tuned frequency.

Letting P*i* be the I. F. filter pass band, I the I. F. of the survey receiver 10, P*a* the A. F. filter pass band, A the audio frequency, then over the frequency spectrum of the local oscillators picked up by the survey receiver, the maximum frequency band S for each separately reproduced signal will be $$S=\frac{Pi}{I}\times\frac{Pa}{A}\times I \text{ cycles}$$

If more than one signal appears in an S cycle frequency band, they may appear as one signal. With the illustrative values mentioned above, the equation would be as follows $$S=\frac{1000}{455,000}\times\frac{50}{1,000}\times 455,000$$

which is in round numbers 50 cycles, or about 100 parts in a million. Seldom if ever are two neighborhood receivers tuned so close to each other that the signals of their local oscillators are indicated as one. Two signals may be within still much less than 50 cycles of each other and yet be separately and distinctly received if the filters have curves characterized by sharp noses and steeply sloping sides. Increasing the audio frequency or the intermediate frequency or decreasing the pass band of either filter 15 or filter 20 will increase the selectivity of the survey receiver of this invention.

The pass band of the filter 15 must be less than twice the audio frequency, which is the difference between the I. F. and the frequency of the beat frequency oscillator. Thus if the I. F. is 455 kc., and the beat frequency oscillator is tuned to produce a 454 kc. frequency wave, which when mixed with the I. F. wave gives an audio frequency of 1,000 cycles, and if the band pass of the I. F. filter 15 is 4 kilocycles, waves of frequencies of 453 kc. will reach the detector 18 and be heterodyned with the waves of the beat signal oscillator to produce a second 1,000 cycle audio frequency wave, resulting in a double count of the incoming signals.

The R. F. amplifier and selector 12, the oscillator 14, and mixer 13 are gang tuned and the respective condensers are simultaneously rotated by a sweep tuning motor 23. A compensating gain control 22 is also driven by motor 23. This gain control reduces the sensitivity of the receiver 10 at the high end of the broadcast band, to equalize the intensity of the signals over the entire spectrum. This is particularly advantageous in television surveying, because of the wide spectrum allotted for television broadcast.

While the signals may be received on an oscilloscope at the reproducer 21, and the luminous pips counted to ascertain the number of listeners' receivers of which the signals within the band limits of any broadcasting station have registered, it is preferable to use a tape recorder of the type which by a marking device records on a travelling ribbon sheet a line, the horizontal abscissa length of which represents time and the ordinate distance above the reference level represents amplitude of radio waves. However, any other type of tape recorder may be used such as the type in which the density of the mark varies with the signal amplitude or the type using the magnetic tape in which the signals are recorded as audio, and later interpreted by ear.

Since the motor which moves the recording tape rotates at a constant speed, and the sweep tuning motor 23 is rotating the tuning impedances in 12, 13 and 14 over angular intervals correlated to frequency range, the length of the recorded line also represents frequency values. As neither the amplitude or frequency need to be ascertained in the use of the invention for its intended purpose, calibration for these characteristics of the signals is of no importance. As the details of the design and construction of the reproducer and recorder are not pertinent to the invention, it will not be described herein, other than to say that it is a cathode ray reproducer and any suitably designed tape recorder of the kind above described.

The motor 23 is so controlled that it rotates the tuning impedances in one direction of rotation over either the entire spectrum or a predetermined selected portion thereof, and then rotates the tuning impedances in the other direction of rotation over the same spectrum arc. These rotational movements are chronologically controlled by a clock, and a preferable pattern consists of one rotational movement over a portion of a fifteen minute interval of that portion of the 24-hour day, during which it is desired to make the survey, followed by a rotational movement in the opposite direction over a similar portion of the next fifteen minutes and so on.

The arrangement by which this chronological control is effected is shown in Figure 2. The reversible sweep tuning motor 23 is driven from a supply voltage source 27. One side of the motor circuit comprises the conductors 28 and 29. The other side consists of the conductor 30, leading to a switch K′ which alternately connects the voltage source 27 to the motor 23 through conductors 31, switch S′, conductors 32, 33, and to terminal 34, lettered C. C. W., or, to the motor 23 through conductors 35, switch S2, conductors 36 and 37 to the terminal 38, lettered C. W. When the current is supplied to the motor through the terminal 38, the motor is rotated in the clockwise direction as seen from the right end of the motor as shown in Figure 2, and when the current is supplied to the motor through the terminal 34, the motor is rotated in the counterclockwise direction. Terminal 39 is the common return terminal.

A clock or other chronometric device 40 may be set to close and open circuit 41 by a switch 25 at predetermined time junctures, as for instance to close the circuit at 6 a. m. and open it at 12 midnight. It may also be additionally set to close and open a switch 26 at predetermined time junctures, as for instance to close it every 30 minutes at five minutes after the hour and half hour, and to open it fifteen minutes after each closing thereof.

This circuit supplies voltage from a suitable source such as 27, to a solenoid 42 (R′) which when energized closes switch K′ in the upper position as seen on the drawing to drive the motor 23 in the counterclockwise direction, and when deenergized closes the switch K′ in its lower normally biased position to drive the motor 23 in the clockwise direction. The switches S′ and S2 are biased to a normally closed position.

Each branch of the motor driving circuit is connected to a solenoid R2 which when energized closes the switch K3 in the motor circuit 44 of the motor 43 which drives the recording device of the reproducer 21 by which the recording tape is moved through the reproducer. When the motor 23 is connected by switch K′ to rotate in the clockwise direction, current flows from conductor 36 over conductor 45, switch K2 and conductor 46 to solenoid R2, and conductor 28 to the voltage supply source 27. When the motor is connected to rotate in the counterclockwise direction, current flows from conductor 32 over conductor 47′ to switch K, conductor 46 to solenoid R2, and thence by conductor 28 to source 27. Switch K2 is operated by solenoid R′ similarly to, and synchronously with switch K′, with the result that in whichever direction of rotation the sweep motor 23 is moving, the unidirectional motor 43 of the recording device is simultaneously rotating to move the tape always in the same direction of travel through the recorder, and the motor 43 is stationary whenever the motor 23 is stationary.

As stated above, the switches S′ and S2 are both held normally in closed position, as shown in full line on the drawing. They may be opened to break the branches of the motor driving circuit by switch arms A and B, arm A opening switch S′ and arm B opening switch S2. These arms which are schematically shown in the drawing, may be mounted and assembled relative to each other in any manner which may be desirable from a mechanical standpoint, provided only (1) that A moves to open switch S′ while B moves away from operative contact with switch S2 and vice versa, (2) that they move simultaneously and in correlation with each other, and (3) that they be adjustable to change their relative positions with respect to each other. As shown in the drawing, they are mounted to rotate on a common pivot shaft 47 to which they are secured, and their angular relationship to each other is therefore fixed, but this relationship is adjustable by loosening and moving one or both arms about the pivot shaft 47 and again securing each or both of them in a new relative position. The shaft 47 is mechanically coupled to motor 23. When K′ is in its upper position and motor 23 is moving in a counterclockwise direction, arms A and B are also moving counterclockwise, arm A eventually contacts switch S′ and opens it. Switch S2 is meanwhile closed but because of the break at K′ between conductors 30 and 35 no current is flowing through it. When arm A opens switch S′, both of the motors 23 and 43 stop. However, while motor 23 was rotating and if the arm was in its extreme position of adjustment relative to arm B (full line positions in drawing), it tuned the receiver 10 to all frequencies of the broadcasting spectrum, beginning, we will say, at the lower end of the spectrum. Assuming the switch 26 had closed switch K′ in the upper position at, we will say, 10:05 a. m., the machine will be preferably designed so that when the arms A and B are in the relative position to each other of extreme adjustment, the arm A will at the end of its counterclockwise movement open switch S′ to stop the motor 23 at the other upper end of the frequency spectrum, and this opening of the switch S′ may, for example, occur at 10:08. Both motors will then remain stationary for a few moments. Then at 10:20, for example, the clock 40 will open switch 26, de-energizing solenoid R′, dropping switch K′ to its biased position, and starting the motor 23 in its clockwise rotational movement, and also starting the recorder motor. As arm A moves away from S′, this switch resets itself in closed position. Arm B now turns clockwise and as the sweep tuning motor has completed its retrograde scanning of the broadcast spectrum, this arm B opens switch S2 at, for example, 10:23, when both motors again stop for ten minutes, until the clock at 10:35 again starts the motor counterclockwise.

It will be observed that it is that one of the arms which stops the rotation of both arms by opening the associated switch at its leftmost position as seen on the drawing, that determines the starting point on the broadcast spectrum at which scanning will begin, upon the next movement of the motor 23 in the other direction. It is therefore obvious that an end portion of the scanned spectrum may be cut off by loosening the one arm hub, say of arm A, from the shaft 47, when the other arm, i. e., B, is in its switch opening position (full lines) at its end of the spectrum scanning, and moving A angularly away from B, as for instance to dotted line position A3 at 35° from its initial full line position, which might represent a frequency difference of 100 kilocycles in a radio broadcast spectrum. Similarly adjusting the arm B will cut off a portion of the other end of the spectrum. Thus the arms may be adjusted to scan only the frequency band of one broadcasting station or to scan any group of stations of adjacent frequency, omitting some of the stations at either or both ends of the spectrum.

The clock 40 may be set to open and close the main time switch 25 to render the receiver 10 inoperative during those hours of the 24-hour day when little or no broadcasting is taking place.

Figure 3:
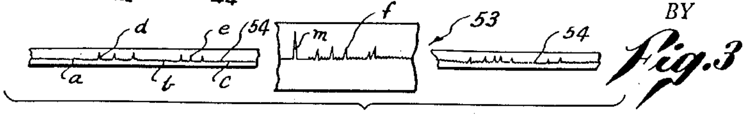
Figure 3 shows a sample portion of a tape record produced by the machine.

In Figure 3 is shown a sample section of a tape 53 which has been run through the recorder and had marked thereon the graphic record of a survey of receiving radio instruments in a neighborhood. The horizontal line 54 is relatively smooth between the wave frequency bands of broadcasting stations as at "*a*," "*b*," "*c*," etc., and is characterized by vertical departures from the horizontal in the range of the broadcasting stations, as at "*d*," "*e*," "*f*," etc., each vertical departure occurring at the frequency of the radio waves from a local oscillator of a listening receiver, and each departure separate and distinct with reference to the other departures.

In the embodiment of the invention herein set forth, no means is provided for discriminating against modulated signals of broadcasting stations which may be of a carrier frequency within the frequency range of the unmodulated signals from the local oscillators of the neighborhood receiving sets. While such means may be provided, as for instance by a squelch circuit, in practice these modulated signals present no real difficulty. They appear as pips like that designated *m* on Figure 3, which is of substantially greater amplitude than the pips representing the unmodulated signals from the oscillators of the neighborhood sets, and the zero amplitude line 54 which is normally wavy due to reed vibration, is relatively straight immediately preceding and immediately following one of these modulated signal pips.

A survey receiving machine 10 may be located in any neighborhood, connected to a battery or utility outlet, and operated for several days or weeks. The tape may then be removed and theh number of ordinate pips counted in the frequency band of each broadcasting station, and the results compiled, tabulated and interpreted. Except for those local oscillators, which send out radio waves too weak to be picked up, either because in a shielded building or for any other reason, and except for the extremely rare cases of pips made by two oscillators broadcasting at almost exactly the same frequency, the results will accurately portray the listening habits of the surveyed area. By using properly selected sample areas in a large district, reliable and significant figures may be obtained for the entire district.

The word "Diurnal" is used herein as relating to a day of 24 hours.

The word "radio" as used in this description and in the appended claims is meant to apply to any high frequency waves traveling at the speed of light, which emanate from broadcasting equipment and are designed to transmit information, and is not to be limited to carrier waves of the frequency commonly used for modulation in the transmission of sound.

I claim:

1. A panoramic radio frequency wave signal receiver for determining the particular radio frequency wave transmitting stations to which one or more superheterodyne radio frequency wave receivers remote from said radio frequency wave signal receiver are tuned, whereby the listening habits of the users of said radio frequency wave receivers may be determined, comprising: tuning and mixing means for sweep receiving and heterodyning the unmodulated signals radiated from the local oscillators of said one or more superheterodyne receivers to provide intermediate frequency signals; an intermediate frequency band pass filter for passing a narrow frequency band of said intermediate frequency signals; a beat frequency oscillator and detector for converting said intermediate frequency signals from said intermediate frequency filter to audio frequency signals; an audio frequency filter for said audio frequency signals, said intermediate frequency filter having a pass band width less than twice the difference between the frequency of said beat frequency oscillator and the center frequency of said intermediate frequency signals; said audio frequency filter having a pass band sufficiently narrow to distinguish between said intermediate frequency signals resulting from said local oscillators of said superheterodyne receivers tuned to substantially, but not exactly, the same wave transmitting station; and a signal reproducer for said audio frequency signals after they have passed through said audio frequency filter, for separately indicating the number of superheterodyne receivers substantially tuned to the same and different wave transmitting stations.

2. The subject matter of claim 1, in which the resultant pass band of said intermediate frequency band pass filter and said audio frequency filter is not more than 100 cycles per second.

3. The subject matter of claim 1, including: means for recording the reproduced audio frequency signals as amplitude indicia spaced longitudinally along the strip of sheet material; a strip moving motor connected to longitudinally move the strip; means for tuning the said receiving and heterodyning means; a tuning motor means connected to operate said tuning means; and chronometrically controlled means for operating said tuning motor in recurring cycles.

4. The subject matter of claim 3 in which the strip moving motor is automatically energized and de-energized respectively, upon the energization and de-energization of the tuning motor means.

5. A panoramic radio frequency wave signal receiver for determining the particular radio frequency wave transmitting stations to which one or more superheterodyne radio wave receiving stations are tuned, whereby the listening habits of the users of said radio frequency wave receivers may be determined, comprising: means for receiving the unmodulated signals radiated from the local oscillators of said one or more superheterodyne receivers, converting them to audio frequency signals, reproducing them, and recording them as amplitude indicia spaced longitudinally along a strip of sheet material; a strip moving motor connected to longitudinally move the strip; means for tuning the said receiving means; a tuning motor connected to operate said tuning means over at least a portion of the frequency range of said tuning means; chronometrically controlled means periodically controlling the energization and de-energization of said strip moving motor and said tuning motor, and the direction of movement of said tuning motor; and means for automatically energizing and de-energizing the said strip moving motor upon the energizing and de-energizing, respectively, of said tuning motor.

6. The subject matter of claim 5, in which said chronometrically controlled means comprises a first electric switch for placing said tuning motor and said strip moving motor in condition for operation during a given period of time; actuating means; a second electric switch in series with the first switch and adapted to energize and de-energize said actuating means at chronometrically spaced horal time intervals within said given period of time, said tuning motor being driven in one direction in response to energization of the actuating means; means coupled to said tuning motor for stopping the tuning motor in its one direction of travel at the end of a scanning period in one direction, said tuning motor being driven in an opposite direction in response to deenergization of the actuating means; and means coupled to the tuning motor for stopping the tuning motor in its opposite direction of travel at the end of the scanning period in the opposite direction.

References Cited in the file of this patent

UNITED STATES PATENTS

| | | |
|---|---|---|
| 2,305,834 | Woodruff | Dec. 22, 1942 |
| 2,411,494 | Bliss | Nov. 19, 1946 |
| 2,454,789 | Frink | Nov. 30, 1948 |
| 2,502,294 | Wallace | Mar. 28, 1950 |
| 2,515,850 | Benson | July 18, 1950 |
| 2,552,585 | Rahmel | May 15, 1951 |
| 2,565,008 | Wallace | Aug. 21, 1951 |
| 2,572,216 | Taylor | Oct. 23, 1951 |